United States Patent [19]

Middleton et al.

[11] Patent Number: 4,872,474

[45] Date of Patent: Oct. 10, 1989

[54] DIVERTER VALVE

[75] Inventors: Philip N. Middleton, Chantilly, Va.; Glen R. Green, Boise, Id.; Harry Girlock, Mountaintop, Pa.

[73] Assignee: Ore-Ida Vended Products, Inc., Boise, Id.

[21] Appl. No.: 257,924

[22] Filed: Oct. 14, 1988

[51] Int. Cl.⁴ .............................................. F16K 17/18
[52] U.S. Cl. .................................. 137/493.8; 99/330; 99/403; 137/512.3; 137/571
[58] Field of Search ...................... 137/493, 493.8, 571, 137/572, 512.3; 99/330, 403; 417/546

[56] References Cited

U.S. PATENT DOCUMENTS

| 2,287,396 | 6/1942 | Roth . |
| 2,347,204 | 4/1944 | Lindsay . |
| 3,070,112 | 12/1962 | Fricke et al. . |
| 3,210,193 | 10/1965 | Martin . |
| 3,410,199 | 11/1968 | Quednau . |
| 3,431,835 | 11/1969 | Angold . |
| 3,608,472 | 9/1971 | Pelster et al. . |
| 3,649,290 | 3/1972 | Angold . |
| 3,655,411 | 4/1972 | Albright . |
| 3,734,744 | 5/1973 | Albright . |
| 3,793,940 | 2/1974 | Albright et al. . |
| 3,853,044 | 12/1974 | Albright et al. . |
| 3,861,286 | 1/1975 | Albright et al. . |
| 4,110,481 | 8/1978 | Albright et al. . |
| 4,412,792 | 11/1983 | La Borde et al. ........... 137/512.3 X |
| 4,502,372 | 3/1985 | Mariotti ................................. 99/330 |
| 4,505,193 | 3/1985 | Mariotti ................................. 99/330 |
| 4,509,659 | 4/1985 | Cloutier et al. ...................... 137/571 |
| 4,590,361 | 5/1968 | Del Fabbro . |

FOREIGN PATENT DOCUMENTS

| 0000012 | 6/1978 | European Pat. Off. . |
| 7216401 | 8/1973 | France . |
| 85-05703 | 12/1985 | PCT Int'l Appl. . |
| 364951 | 11/1962 | Switzerland . |

Primary Examiner—Stephen Hepperle
Attorney, Agent, or Firm—Burns, Doane, Swecker & Mathis

[57] ABSTRACT

One end of a valve assembly has a first check valve arrangement and is positioned in a channel connecting a variable volume reservoir and a second chamber. The other end of the valve assembly has a second check valve and is attached to a movable wall of the variable volume reservoir. Each check valve includes an element which opens in response to pressure changes in the variable volume reservoir: the first check valve opening in response to pressure increases while the second check valve opens in response to pressure decreases. The valve assembly is bodily movable with the wall of the variable volume reservoir such that the first check valve reciprocates in the channel.

9 Claims, 3 Drawing Sheets

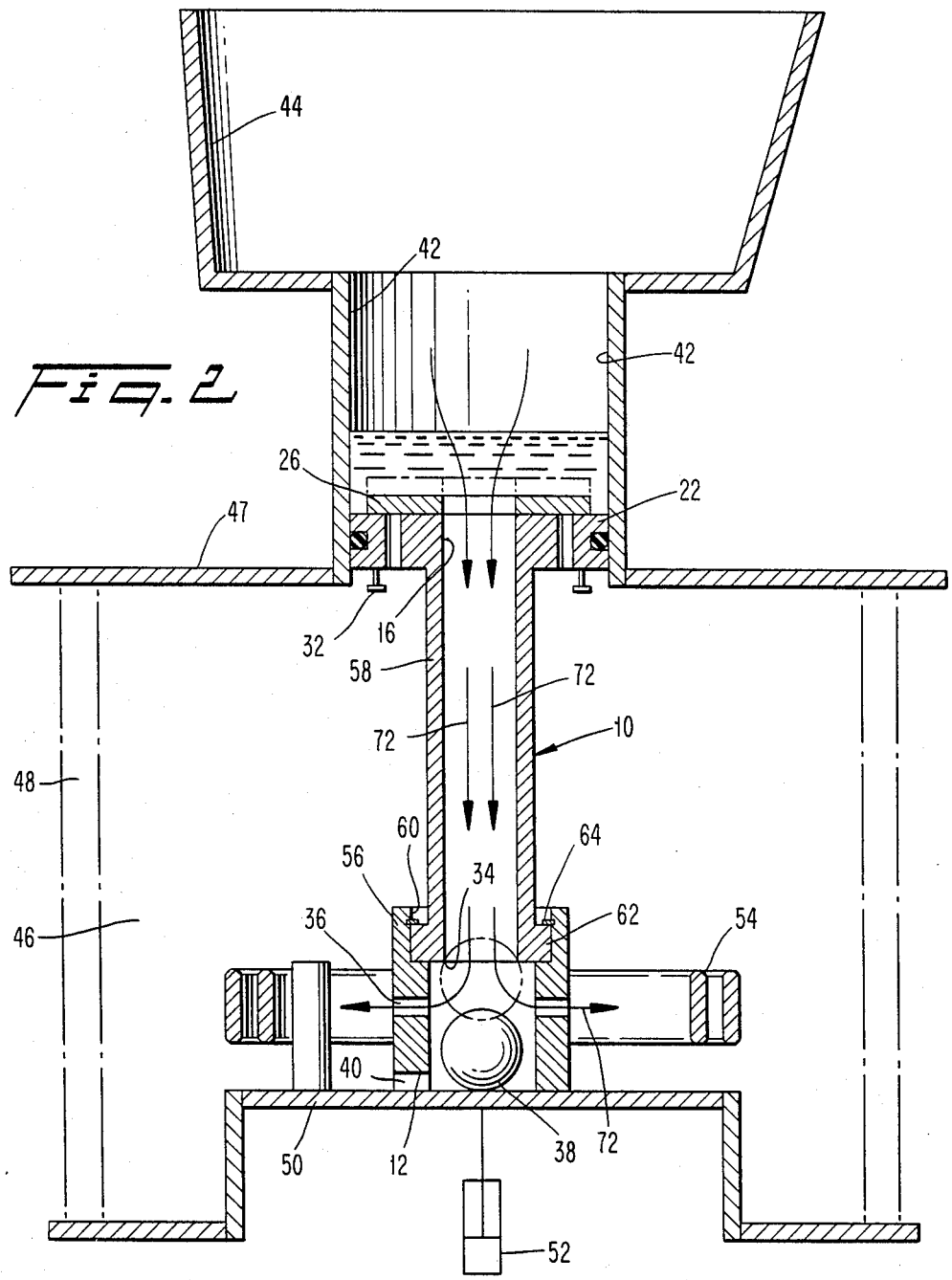

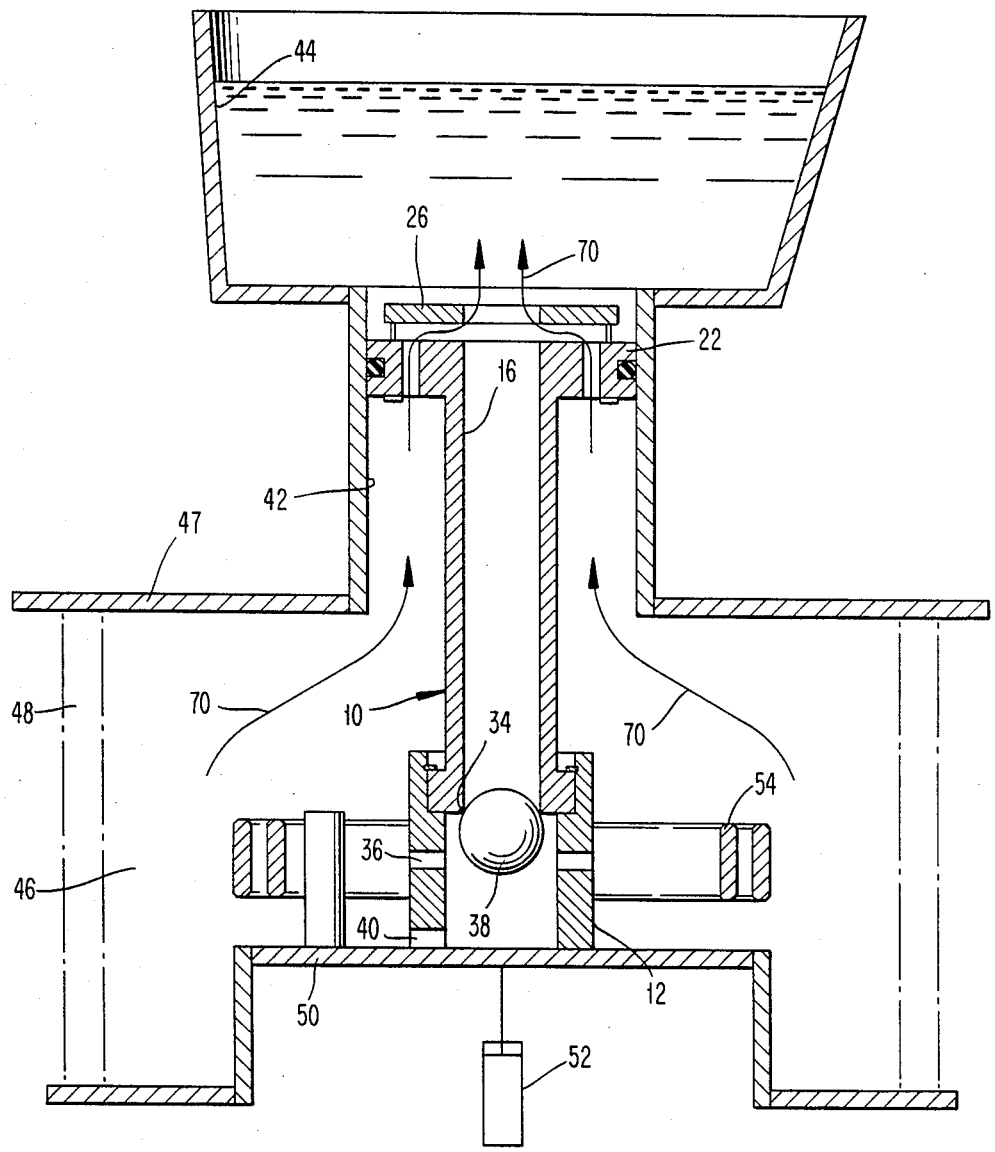

DIVERTER VALVE

BACKGROUND OF THE INVENTION

The present invention relates generally to fluid control valves. More particularly, the present invention concerns a diverter valve which is bodily movable and which has a pair of check valves.

In the past it has been known to use a valve arrangement to control the flow of cooking oil between a reservoir chamber and a cooking chamber. See for example, U.S. Pat. No. 4,502,372 issued on Mar. 5, 1985 to Rene Mariotti for a Deep-Fryer Pan for Industrial Fryers and U.S. Pat. No. 4,505,193 issued on Mar. 19, 1985 to Rene Mariotti for an Industrial Deep-Fryer. Those early devices simply involved a check valve arrangement at each end of concentric flow paths for the oil. For a variety of reasons, that earlier design has not proved to be acceptable.

A later approach to such valve arrangements included the use of fluid actuated disk valves carried by a stem. In response to sufficient positive flow against gravity, the disk valves moved to a first position where fluid communication was permitted longitudinally through the assembly but lateral flow into the assembly was blocked. In a second position attained in response to gravity and negative flow, the disk valves blocked longitudinal flow through the assembly by permitted lateral flow into the assembly. An example of this type of valve assembly is illustrated in U.S. Ser. No. 927,401 of Rene Mariotti, filed Nov. 6, 1986 for a Flow Control Valve. With such an arrangement, the flow could not be adequately directed to auxiliary apparatus such as an oil heater. This particular valve exhibited some specific disadvantages: the valve did not work when there was a slow application of pressure; the valve did not provide an effective fluid seal.

The particular apparatus for which these flow control valves are intended is a vending machine for use in preparation of french fried potatoes. The vending machine application is fraught with a variety of problems which are not usually encountered in fluid control devices. For example, one problem which has plagued the earlier versions of these flow control valves is the difficulty in cleaning them. In food service applications, it is necessary that the flow control valves be adapted for easy disassembly so that the valves can be readily cleaned.

Another problem concerns reliability of operation. In food service applications, the control valve must exhibit a high level of reliability. That requirement is even further exacerbated when the control valve is to be used in an untended vending operation.

From these and other problems and deficiencies that will be apparent to those of ordinary skill in the art, it will be apparent that the need continues to exist for an improved control valve assembly which obviates those problems and deficiencies.

SUMMARY OF THE INVENTION

A valve body is disposed in a variable volume reservoir. The valve body defines a fluid channel between its first end and its second end. At the first end of the valve body the fluid channel is radially enlarged to define a valve seat and to slidably receive a valve ball. In addition, the valve body is provided with a plurality of lateral ports between the first end and the valve seat to permit fluid communication with the fluid channel.

The second end of the valve body has a radially outwardly extending valve flange that has a plurality of openings therethrough. The outer surface of the flange is sized to provide a close running fit with a circularly cylindrical tube that surrounds the flange and within which the flange is adapted to slide. An annular valve ring covers the openings through the flange and is mounted on studs which permit the valve ring to move axially with respect to the valve flange. These studs are also effective to control the maximum distance by which the annular valve ring is permitted to be displaced from the flange.

With this arrangement, the valve ring is lifted by positive pressure of oil in the variable volume chamber. When there is a negative pressure in the oil of the variable volume chamber, the valve ring is held tightly against the valve flange and prevents flow through the openings of the flange.

When the negative pressure condition exists, the valve ball at the first end of the valve body is moved away from the valve seat by the fluid pressure differential which exists between the fluid channel and the variable volume chamber. Accordingly, fluid flow is established through the fluid channel, out the lateral ports and into the variable volume chamber. On the other hand, when a positive pressure conditions exists in the variable volume chamber, the fluid pressure differential between the chamber and the fluid channel is reversed and that pressure differential acts to hold the valve ball against the valve seat thereby preventing flow through the fluid channel. If desired, the valve ball can also be designed to be buoyant in the fluid filling the variable volume chamber. Under that condition, the buoyancy of the valve ball also acts to hold the valve ball against the valve seat to prevent flow through the fluid channel.

In food service applications, it will also be advantageous to make the valve body so that it can be readily disassembled for cleaning. To this end, the valve body may include a housing for attachment to one end of the variable volume chamber and a valve tube carrying the valve flange. Preferably, the valve tube has a smaller internal diameter than the housing. As a result, the valve tube defines the valve seat. A suitable conventional snap ring may be provided to fix the housing and the valve tube together in the axial direction. Such a snap ring provides the further advantage that it allows relative rotational movement between the valve tube and the housing and allows easy disassembly for cleaning purposes.

If it is desired to provide a very tight fluid seal at the valve flange end thereby obtaining an even more positive valve response and avoiding metal to metal contact in the surrounding generally cylindrical channel, the valve flange may be provided with an annular groove in its radially outermost surface. An O-ring seal may then be positioned in that groove to give an improved fluid seal.

BRIEF DESCRIPTION OF THE DRAWINGS

Many objects and advantages of the present invention will be apparent to those skilled in the art when this specification is read in conjunction with the attached drawings wherein like reference numerals have been applied to like elements and wherein:

FIG. 2 is a cross-sectional view through the diverter valve assembly of FIG. 1 in the environment of a french fry cooking machine; and FIG. 3 is a cross-sectional view similar to FIG. 2 illustrating the diverter valve under the condition of positive pressure in the variable volume reservoir.

DESCRIPTION OF THE PREFERRED EMBODIMENT

Figure 1:
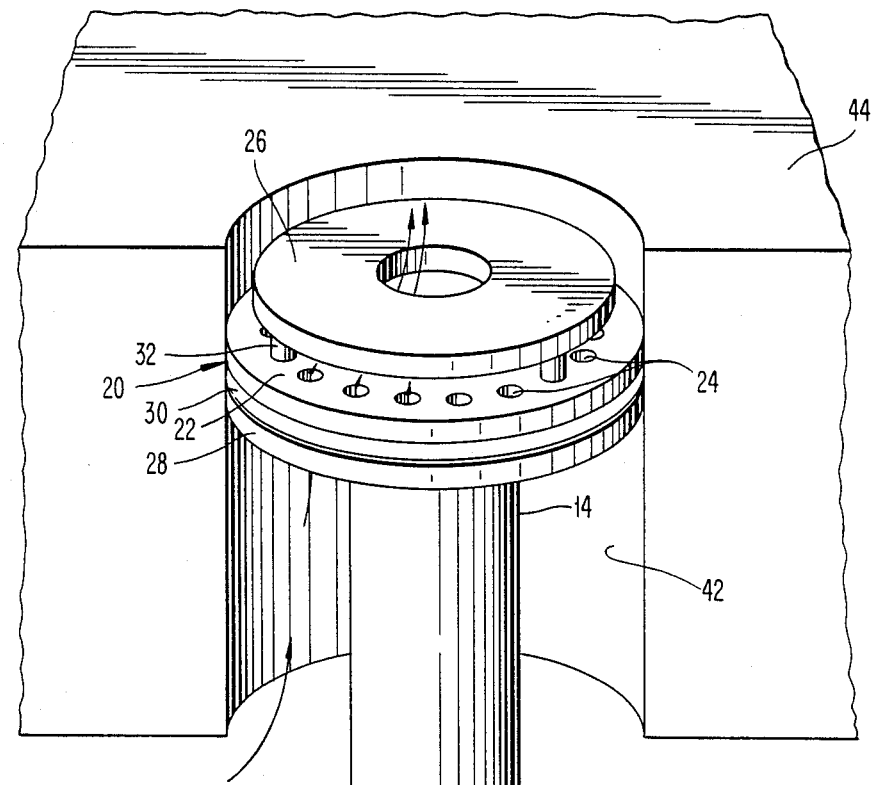
FIG. 1 is a perspective view of a diverter valve assembly according to the present invention.

A diverter valve 10 (see FIG. 1) which is suitable for use in the cooking oil supply system for a french fry vending machine has a first end 12, a second end 14, and a fluid channel extending longitudinally therethrough between the first end 12 and the second end 14.

Since the diverter valve 10 is uniquely suited for use in the food service industry, all parts should be made from a material that is inert to foods, easy to clean, and capable of sterilization. Preferably, all parts of the diverter valve 10 of the present invention are made from a suitable grade of stainless steel.

At the first end 12, the diverter valve 10 is provided with a first check valve assembly 18. The first check valve 18 is operable to regulate flow through the fluid channel 16. More particularly, the first check valve 18 allows fluid to flow from the second end 14 to the first end 12 but prevents fluid from flowing from the first end 12 to the second end 14.

At the second end 14, the diverter valve 10 is provided with a second check valve assembly 20. This second check valve 20 regulates flow around the second end 14 of the diverter valve 10. The second check valve 20 allows fluid to flow past the diverter valve 10 and its first end 12 but prevent fluid from flowing from the first end 12 toward the second end 14 an around the diverter valve 10.

Since the purpose of the second check valve 20 is to regulate flow between the diverter valve 10 and the surrounding channel, the second check valve 20 is essentially exposed at the second end 14 of the diverter valve 10. The second check valve 20 includes an annular flange 22 which is securely connected to the second end 14 of the diverter valve 10. For example, the annular flange 22 may be welded to the diverter valve 10 so that there is no fluid communication therebetween.

The annular flange 22 is provided with a plurality of axially-extending openings 24 which are spaced around the flange itself. These openings are sized to allow a predetermined mass flow rate of fluid to pass therethrough. While the axially-extending openings 24 could be any convenient shape, it is convenient that the axially-extending openings 24 be bores with a circular cross section. Where the axially-extending openings 24 are circular bores, the diameter of the bore is selected to be less than the radial width of the annular flange 22 so that the bores do not cut into the sidewall of the diverter valve 10 and do not interrupt the peripheral surface 28 of the annular flange 22.

Positioned next to the annular flange 22 is a valve ring 26. The valve ring 26 is connected to the annular flange 22 of the diverter valve 10 by a suitable restraint which may, for example, be a plurality of studs 32. Each stud 32 may be threadably attached to the valve ring 26. In addition, each stud 32 passes through a corresponding opening in the annular flange 22 such that a head of the stud 32 is operable to limit the axial distance that the valve ring 26 can move from the annular flange 22.

Generally two studs 32 are needed for the second check valve 20, but the guidance of the valve ring 26 provided by surrounding structure may permit the use of only one stud 32. It is of course possible to reverse the orientation of the studs 32 so that the studs are attached to the annular flange 22 and slidably received in openings of the valve ring 26.

The valve ring 26 is proportioned so that it will completely cover the axially-extending openings 24 of the annular flange 22 when the valve ring 26 lies against the annular flange 22. In this fashion, the valve ring 26 prevent fluid from flowing through the axially-extending openings 24. When, however, there is pressure in the fluid in the axially-extending openings 24 of the annular flange 22, that fluid pressure is operable to lift the valve ring 26 so that fluid can pass through the axially-extending openings 24 and the open center of the valve ring 26. Depending upon the arrangement of the valve ring 26 and the axially-extending openings 24 of the annular flange 22, it may also be possible to provide fluid communication around the peripheral edge of the valve ring 26.

Depending upon the desired effectiveness of the second check valve 20, the peripheral surface 28 may simply be sized so that there is a running fit between the peripheral surface and the surrounding channel. If, however, an even better fluid seal is desired, then the peripheral surface 28 may be provided with a circumferential groove and an O-ring 30. That O-ring arrangement will seal between the peripheral surface 28 of the annular flange 22 and the inside of the channel.

At the first end 12 of the diverter valve 10 (see FIG. 2) is the first check valve 18. The first check valve 18 includes a radial enlargement of the fluid channel 16 which defines a valve seat 34. Located between the valve seat 34 and the first end 12 are a plurality of lateral opening 36. These lateral openings 36 may be equiangularly spaced around the circumference of the diverter valve 10. Moreover, these lateral opening 36 are axially spaced from the first end 12 such that fluid flowing out of the lateral opening 36 comes out of the fluid channel 16 at the same elevation. Besides the lateral opening 36, there is a pressure relief opening 40 that is disposed between the lateral opening 36 and the first end 12. This pressure relief opening 40 allows fluid to pass into and out of the fluid channel 16 so that the valve ball 38 is not hydrauliccally constrained against movement in response to pressure changes. In addition, by positioning this relief opening 40 at the lowermost end of the valve body, the opening 40 is operable to allow cooking debris to flow out of the valve body.

Within the fluid channel 16, and between the first end 12 and the valve seat 34 there is a generally spherical valve ball 38. The valve ball 38 has a diameter which is less than the diameter of the fluid channel 16 at the first end 12 but which is greater than the diameter of the valve seat 34. With this arrangement, the valve ball 38 can seat against the valve seat 34 when the differential pressure conditions are appropriate. The valve ball 38 is preferably constructed so that it is buoyant in the fluid within which the diverter valve 10 is immersed. It is also possible that the valve ball 38 could be spring biased against the valve seat 34.

The diverter valve 10 itself is disposed within an expansible chamber 46 that is in fluid communication with a cooking chamber 44 through a generally cylindrical passage 42. Typically, the cooking chamber 44 will be closed so that food, such as french fries, can be cooked therein.

As can be seen from FIG. 2, the generally cylindrical passage 42 extends between the cooking chamber 44 and the expansible chamber 46. Moreover, the second check valve 20 of the diverter valve 10 is slidably positioned in the generally cylindrical passage 42. The cross-sectional shape of the generally cylindrical passage 42 is selected to conform to the cross-sectional shape of the second check valve 20. Preferably, the inner surface of the generally cylindrical passage 42 and the outer surface of the second check valve 20 are circularly cylindrical. In this situation, the diameter of the inside surface of the generally cylindrical passage 42 is slightly larger than the outside diameter of the second check valve 20 so that there is a running tolerance therebetween. Moreover, the axial length of the generally cylindrical passage 42 is selected to be greater than the length of the stroke of an actuating device 52 that may, for example, be a suitable conventional double acting pneumatic cylinder, a suitable conventional double acting hydraulic cylinder, or even a motor-actuated cam device. With the foregoing arrangement, the second check valve 20 will remain in the generally cylindrical passage 42 during its actuation by the actuating device 52.

The diverter valve 10 itself is positioned within the expansible chamber 46. In fact, the first end 12 of the diverter valve 10 is preferably directly connected to a movable wall 50 of the expansible chamber 46. The expansible chamber 46 is defined by a fixed wall 47 through which the generally cylindrical passage 42 opens, the movable wall 50, and a bellows 48 which is connected at one end to the fixed wall 47 and at the other end to the movable wall 50 so that there is a fluid-tight connection. The movable wall 50 is also connected to the actuating device 52. Thus, when the actuating device is caused to extend, the movable wall 50 moves toward the fixed wall 47 reducing the volume of the expansible chamber 46. Conversely, when the actuating device 52 is retracted, the movable wall 50 moves away from the fixed wall 47 thereby increasing the volume of the expansible chamber 46.

Within the expansible chamber 46 at the same elevation relative to the movable wall 50 as the lateral opening 36 of the diverter valve 10 a heating means 54 is provided. The heater 54 may be a spiral element supported from the movable wall 50 in a conventional manner.

Preferably, the expansible chamber 46 is completely filled with a cooking oil suitable for cooking french fry potato pieces. In addition, the generally cylindrical passage 42 is partially full of cooking oil when the movable wall 50 is in its lower most position as illustrated in FIG. 2. In this regard, the level of the cooking oil in the cylindrical passage 42 is selected such that there is sufficient volume in the cylindrical passage 42 above the lowermost oil level to accommodate thermally-induced volumetric expansion of the cooking oil caused by the heater 54. This is accomplished by appropriately selecting the length and inside diameter of the cylindrical passage 42.

The stroke of the actuating device 52 is selected such that the movable wall 50 and the bellows 48 cooperate to displace a volume of cooking oil which is sufficient to completely fill the generally cylindrical passage 42 and to fill the cooking chamber 44 to a predetermined level. Accordingly, when the actuating device 52 is extended, cooking oil is expelled from the expansible chamber 46 to fill the cooking chamber 44. Conversely, when the actuating device 52 is retracted, cooking oil is forcibly returned to the expansible chamber 46 from the cooking chamber 44 as a result of negative pressure in the expansible chamber 46.

Parenthetically, it should be noted that references to positive and negative pressure in the application are references to positive and negative gauge pressure measured relative to atmospheric pressure.

So that the diverter valve 10 can be easily disassembled for cleaning and maintenance, the diverter valve 10 (see FIG. 2) is fashioned from a housing 56 at the first end 12 and a tube 58 at the second end 14. The housing 56 may be secured to the movable wall 50, for example by welding, and includes a counterbore 60 at its other end. This counterbore 60 is sized to slidably receive a radially enlarged end 62 of the tube 58. The axial length of the radially enlarged end 62 is selected so that there is lateral support for second check valve 20 carried at the other end of the tube 58.

It is also possible that the housing 56 is detachably connected to the movable wall 50. Such an arrangement may be desirable to further facilitate disassembly and cleaning.

In applications where the expansible chamber 46 has a very large volumetric capacity, the housing may simply be disposed in the expansible chamber 46 without being attached to the movable wall. In such an application, the second end 14 of the diverter valve 10 would be retained in the cylindrical passage 42. Moreover, it may be desired to construct the diverter valve 10 so that the maximum diameter of the valve body is less and the minimum diameter of the cylindrical passage 42 so that the diverter valve 10 can be inserted and removed through the cylindrical passage 42.

The counterbore 60 includes a groove that receives a conventional snap ring 64. That snap ring 64 holds the tube 58 axially together with the housing 56 while permitting relative rotation therebetween. There are, of course, other methods that can be used to secure the tube 58 axially to the housing 56. In this regard, such other methods of connection would not necessarily have to permit the relative rotation that is obtained with the snap ring 64.

As shown in FIG. 2, the tube 58 has the fluid channel 16 therein. As it passes through the tube 58, the fluid channel 16 has a diameter which is less than the inside diameter of the housing 56. As a result, the end of the fluid channel 16 defines the valve seat 34 for the valve ball 38.

Having described the various structural elements of the diverter valve 10 of this invention, it is now instructive to describe operation of the diverter valve 10 with reference to FIG. 2 and FIG. 3.

When the diverter valve 10 is in a static condition, the valve ring 26 is held against the annular flange 24 by gravity. In addition, the buoyant valve ball 38 is urged against the valve seat 34 by the buoyant force acting on the ball 38 and seals the channel through the diverter valve 10.

When the actuating device 52 is energized, it causes the piston rod to extend where the actuating device 52 is a pneumatic or hydraulic cylinder. Since the piston rod is attached to the movable wall 50, the piston rod also displaces the movable wall 50 toward the fixed wall 47 reducing the axial length of the bellows 48. If the actuating device 52 is another type of a device, then the actuating device 52 may itself be directly attached to the movable wall 50. Moreover, since the diverter valve 10 is attached to the movable wall 50, displacement of the movable wall 50 causes the second check valve 20 to slide axially further into the generally cylindrical passage 42.

That displacement of the movable wall 50 causes a reduction in the volume of the expansible chamber 46. That volume reduction causes the pressure in the cooking oil contained in the expansible chamber 46 to increase. As the pressure in the expansible chamber 46 increases, the buoyant valve ball 38 is further urged by the pressure differential across the valve ball into engagement with the valve seat 34 so that the first check valve 18 effectively closes the fluid channel 16. At the same time, the pressure in the expansible chamber 46 passes through the axially-extending openings 24 of the annular flange 22 and acts on the bottom surface of the valve ring 26. Pressure on the bottom surface of the valve ring 26 lifts the valve ring 26 on the studs 32 and allows cooking oil to flow through the axially-extending openings 24 into the generally cylindrical passage 42 and, ultimately, into the cooking chamber 44. The position of the valve ball 38 of the first check valve 18 and the valve ring 26 of the second check valve 20 at the end of the stroke of the actuating device 52 is illustrated in FIG. 3. For convenience, FIG. 3 is provided with arrows 70 that illustrate the path cooking oil takes during the extension stroke of the actuating device 52.

When it is time for the actuating device 52 to withdraw cooking oil from the cooking chamber 44 into the expansible chamber 46, the actuating device contracts drawing its piston rod inwardly. That retracting movement of the piston rod pulls the movable wall 50 away from the fixed wall 47 and increases the axial length of the bellows 48. Accordingly, the volume of the expansible chamber 46 increases causing a reduction in the fluid pressure existing in that expansible chamber 46. The diverter valve 10 will also slide axially in the cylindrical passage 42 as the expansible chamber 46 is enlarged by movement of the movable wall 50.

As the pressure in the expansible chamber 46 is reduced, it is communicated to the bottom of the valve ring 26 through the axially-extending openings 24. Gravity will already have closed the valve ring 26 against the annular flange 32. However, the differential pressure acting across the valve ring 26 presses it tightly against the annular flange 22 sealing off fluid access to the axially-extending openings 24. Thus the second check valve 20 is closed.

Simultaneously, the reduction in fluid pressure in the expansible chamber 46 causes a pressure differential which pushes the buoyant valve ball 38 downwardly and away from the valve seat 34. Accordingly, fluid communication is established between the fluid channel 16, through the valve seat 34 and through the lateral opening 36 of the housing 56 into the expansible chamber 46 so that oil can flow therethrough. The position of the valve ball 38 of the first check valve 18 and the valve ring 26 of the second check valve 20 at the end of the retracting stroke of the actuating device are illustrated in FIG. 2.

Since the returning cooking oil is discharged from the diverter valve 10 at the elevation of the heater 54, the used (i.e., cool) cooking oil is brought immediately into contact with the source of heat. As the oil is heated, convection currents allow the hot oil to rise to the top of the expansible chamber 46. Therefore, when the actuating device is again energized, the hot oil at the top of the expansible chamber 46 flows out through the second check valve 20 and into the cooking chamber 44.

In those applications where an O-ring 30 is used around the annular flange 22, the sliding movement of the diverter valve 10 and the O-ring 30 are effective to scrape oxidized oil and other deposits from the surface of the cylindrical passage 42.

Another advantage of the diverter valve 10 of this invention resides in the simplicity with which it can be removed from the vending machine. More particularly, when it is necessary to remove the diverter valve 10 or to clean the expansible chamber 46, the movable wall 50 and bellows 48 are simply disassembled. Since the diverter valve 10 is slidably received in the generally cylindrical passage 42, the diverter valve 10 simply pulls out of the generally cylindrical passage 42 when the movable wall 50 is detached. To actually disassemble the diverter valve 10, it is only necessary to remove the snap ring 64. With the snap ring 64 removed, the tube 58 slides out of the housing 56 and the valve ball 38 can be taken out. All parts of the assembly can then be cleaned and/or sterilized, as may be required.

It will now be apparent that a diverter valve has been described which overcomes the problems and disadvantages with the prior art devices. Moreover, it will be apparent to those skilled in the art that numerous modifications, variations, substitutions, and equivalents exist for features of the invention which are described above. Accordingly, it is expressly intended that this invention embrace all such modifications, variations, substitutions, and equivalents which fall within the spirit and scope of the invention as defined in the appended claims.

What is claimed is:

1. A diverter valve for controlling fluid flow through a generally cylindrical passage between an expansible chamber and a second chamber comprising:
   a valve body having a first end connected to the expansible chamber and a second end disposed in the generally cylindrical passage, defining a generally longitudinal fluid channel, having a radial enlargement in the fluid channel at the first end, and having at least one lateral opening through the valve body between the radial enlargement and the first end;
   a valve flange attached to the second end of the valve body, having an outside diameter sized to provide a running fit with the generally cylindrical passage, and having a plurality of axially-extending openings therethrough;
   an annular valve ring mounted to the valve body, axially movable relative to the valve flange, and having a position where the valve ring covers the axially-extending openings of the valve flange; and
   a valve ball in the fluid channel between the radial enlargement and the first end, having a position engaging the radial enlargement which blocks fluid communication between the radial enlargement and the lateral opening.

2. The diverter valve of claim 1 wherein the annular valve ring is carried by a plurality of studs which slidably extend through the annular flange to guide axial movement of the valve ring and to limit the axial travel of the valve ring relative to the valve flange.

3. The diverter valve of claim 1 wherein the annular valve flange has a plurality of generally circular openings, each with a diameter that is less than the radial width of the valve flange.

4. The diverter valve of claim 1 wherein:
the valve flange includes a peripheral surface with a groove; and
an O-ring is disposed in the groove to enhance the fluid seal between the peripheral surface of the flange and the generally cylindrical passage.

5. The diverter valve of claim 1 wherein the valve body includes:
a housing attached to a movable wall of the expansible chamber, defining the first end of the valve body;
a valve tube defining the second end of the valve body, having a portion received in the housing, having an inside diameter smaller than the inside diameter of the housing such that the end of the valve tube received in the housing defines a seat for the valve ball; and
retaining means for axially connecting the housing and the valve tube.

6. The diverter valve of claim 1 wherein:
the expansible chamber is filled with cooking oil; and
the valve ball is buoyant in the oil which fills the expansible chamber.

7. A diverter valve for controlling fluid flow through a generally cylindrical passage between a first chamber and a second chamber comprising:
a valve body having a first end disposed in the first chamber and a second end disposed in the generally cylindrical passage, defining a generally longitudinal fluid channel, having a radial enlargement in the fluid channel at the first end, and having at least one lateral opening through the valve body between the radial enlargement and the first end;
a valve flange attached to the second end of the valve body, having an outside diameter sized to provide a running fit with the generally cylindrical passage, and having a plurality of axially-extending openings therethrough;
an annular valve ring mounted to the valve body, axially movable relative to the valve flange, and having a position where the valve ring covers the axially-extending openings of the valve flange;
a valve ball in the fluid channel between the radial enlargement and the first end, having a position engaging the radial enlargement which blocks fluid communication between the radial enlargement and the lateral opening; and
means for elevating and reducing the pressure in the first chamber relative to ambient pressure so as to create pressure differentials across the valve ball and the valve ring.

8. The diverter valve of claim 7 wherein the valve body has an outside diameter which is less than the inside diameter of the cylindrical passage whereby the valve body can removed from the first chamber through the cylindrical passage.

9. The diverter valve of claim 7 wherein:
the first chamber is filled with a fluid; and
the valve ball is buoyant in the fluid filling the first chamber.

* * * * *